(12) United States Patent
Lee et al.

(10) Patent No.: US 11,722,996 B2
(45) Date of Patent: Aug. 8, 2023

(54) ACTIVATION AND RETRANSMISSIONS FOR POOL OF RESOURCES

(71) Applicant: LG ELECTRONICS INC., Seoul (KR)

(72) Inventors: Youngdae Lee, Seoul (KR); Giwon Park, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 17/364,148

(22) Filed: Jun. 30, 2021

(65) Prior Publication Data

US 2022/0007337 A1 Jan. 6, 2022

(30) Foreign Application Priority Data

Jul. 1, 2020 (KR) .................. 10-2020-0080858

(51) Int. Cl.
| | |
|---|---|
| *H04W 56/00* | (2009.01) |
| *H04W 72/02* | (2009.01) |
| *H04W 72/0446* | (2023.01) |
| *H04L 1/1812* | (2023.01) |
| *H04W 80/02* | (2009.01) |
| *H04L 1/1867* | (2023.01) |
| *H04W 72/21* | (2023.01) |
| *H04W 72/23* | (2023.01) |

(52) U.S. Cl.
CPC .......... *H04W 72/02* (2013.01); *H04L 1/1819* (2013.01); *H04L 1/1896* (2013.01); *H04W 72/0446* (2013.01); *H04W 72/21* (2023.01); *H04W 72/23* (2023.01); *H04W 80/02* (2013.01)

(58) Field of Classification Search
CPC ............. H04W 72/02; H04W 72/0413; H04W 72/0446; H04W 72/14; H04W 80/02; H04L 1/1819; H04L 1/1896
USPC .......................................................... 370/329
See application file for complete search history.

(56) References Cited

U.S. PATENT DOCUMENTS

| | | | | |
|---|---|---|---|---|
| 11,457,410 | B2 * | 9/2022 | Huang | H04W 76/14 |
| 2021/0167897 | A1 * | 6/2021 | Seidel | H04L 1/1864 |
| 2021/0385834 | A1 * | 12/2021 | Morozov | H04W 72/048 |
| 2021/0400632 | A1 * | 12/2021 | Yang | H04L 27/26025 |
| 2022/0030555 | A1 * | 1/2022 | Chae | H04L 5/1469 |
| 2022/0368461 | A1 * | 11/2022 | Zhang | H04L 1/16 |

OTHER PUBLICATIONS

Section 5.7 of 3GPP TS 38.300 V16.1.0.
Section 16.9 of 3GPP TS 38.300 V16.1.0.

* cited by examiner

*Primary Examiner* — Sai Ming Chan
(74) *Attorney, Agent, or Firm* — Dentons US LLP

(57) ABSTRACT

A method and apparatus for activation and retransmissions for a pool of resources is provided. A first device autonomously selects a set of resources on a pool of resources for N number of transmissions of a Transport Block (TB) stored in a process. The first device transmits, to the network, a request for a retransmission grant for the process based on i) the N number of transmission being completed and ii) retransmission of the TB being required. The request includes a Hybrid Automatic Repeat request (HARQ) process identifier (ID) associated to the process.

16 Claims, 13 Drawing Sheets

ACTIVATION AND RETRANSMISSIONS FOR POOL OF RESOURCES

This application claims priority to Korean Patent Application No. 10-2020-0080858 filed on Jul. 1, 2020, the contents of which is hereby incorporated by reference herein in its entirety.

TECHNICAL FIELD

The present disclosure relates to activation and retransmissions for a pool of resources.

BACKGROUND

3rd Generation Partnership Project (3GPP) Long-Term Evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in International Telecommunication Union (ITU) and 3GPP to develop requirements and specifications for New Radio (NR) systems. 3GPP has to identify and develop the technology components needed for successfully standardizing the new RAT timely satisfying both the urgent market needs, and the more long-term requirements set forth by the ITU Radio communication sector (ITU-R) International Mobile Telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced Mobile BroadBand (eMBB), massive Machine Type Communications (mMTC), Ultra-Reliable and Low Latency Communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as Vehicle-to-Infrastructure (V2I), Vehicle-to-Network (V2N), Vehicle-to-Vehicle (V2V), Vehicle-to-Pedestrian (V2P), Vehicle-to-Device (V2D) and Vehicle-to-Grid (V2G).

SUMMARY

In an aspect, a method performed by a first device operating in a wireless communication system is provided. The method includes autonomously selecting a set of resources on a pool of resources for N number of transmissions of a Transport Block (TB) stored in a process, and transmitting, to the network, a request for a retransmission grant for the process based on i) the N number of transmission being completed and ii) retransmission of the TB being required. The request includes a Hybrid Automatic Repeat request (HARQ) process identifier (ID) associated to the process.

In another aspect, an apparatus for implementing the above method is provided.

DETAILED DESCRIPTION

Figure 1:
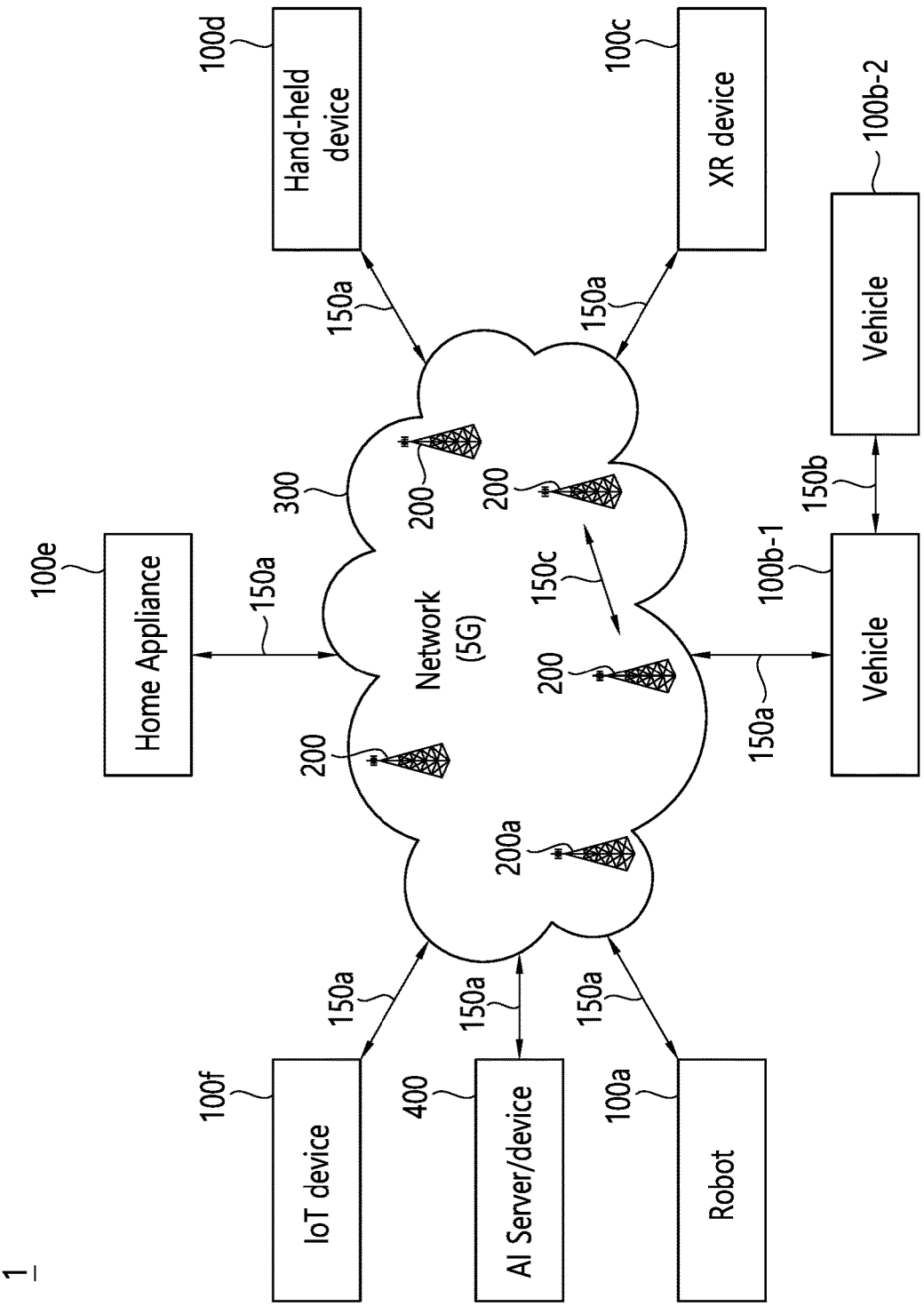
FIG. 1 shows an example of a communication system to which implementations of the present disclosure is applied.

The following techniques, apparatuses, and systems may be applied to a variety of wireless multiple access systems. Examples of the multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. CDMA may be embodied through radio technology such as Universal Terrestrial Radio Access (UTRA) or CDMA2000. TDMA may be embodied through radio technology such as Global System for Mobile communications (GSM), General Packet Radio Service (GPRS), or Enhanced Data rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802.20, or Evolved UTRA (E-UTRA). UTRA is a part of a Universal Mobile Telecommunications System (UMTS). 3rd Generation Partnership Project (3GPP) Long-Term Evolution (LTE) is a part of Evolved UMTS (E-UMTS) using E-UTRA. 3GPP LTE employs OFDMA in downlink (DL) and SC-FDMA in uplink (UL). Evolution of 3GPP LTE includes LTE-Advanced (LTE-A), LTE-A Pro, and/or 5G New Radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced Mobile BroadBand (eMBB), (2) a category of massive Machine Type Communication (mMTC), and (3) a category of Ultra-Reliable and Low Latency Communications (URLLC).

Referring to FIG. 1, the communication system 1 includes wireless devices 100a to 100f, Base Stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using Radio Access Technology (RAT) (e.g., 5G NR or LTE) and may be referred to as communication/radio/5G devices. The wireless devices 100a to 100f may include, without being limited to, a robot 100a, vehicles 100b-1 and 100b-2, an eXtended Reality (XR) device 100c, a hand-held device 100d, a home appliance 100e, an Internet-of-Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called User Equipments (UEs). A UE may include, for example, a cellular phone, a smartphone, a laptop computer, a digital broadcast terminal, a Personal Digital Assistant (PDA), a Portable Multimedia Player (PMP), a navigation system, a slate Personal Computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a Closed-Circuit TV (CCTV), a recorder, or a black box.

The FinTech device may be, for example, a device capable of providing a financial service such as mobile payment. For example, the FinTech device may include a payment device or a Point of Sales (PoS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e g , channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through Computer Graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple Sub-Carrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., Frequency Range 1 (FR1) and Frequency Range 2 (FR2). The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter Wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names For example, ZigBee technology may generate Personal Area Networks (PANs) associated with small/low-power digital communication based on various specifications such as IEEE 802.15.4 and may be called various names FIG. 2 shows an example of wireless devices to which implementations of the present disclosure is applied.

Figure 2:
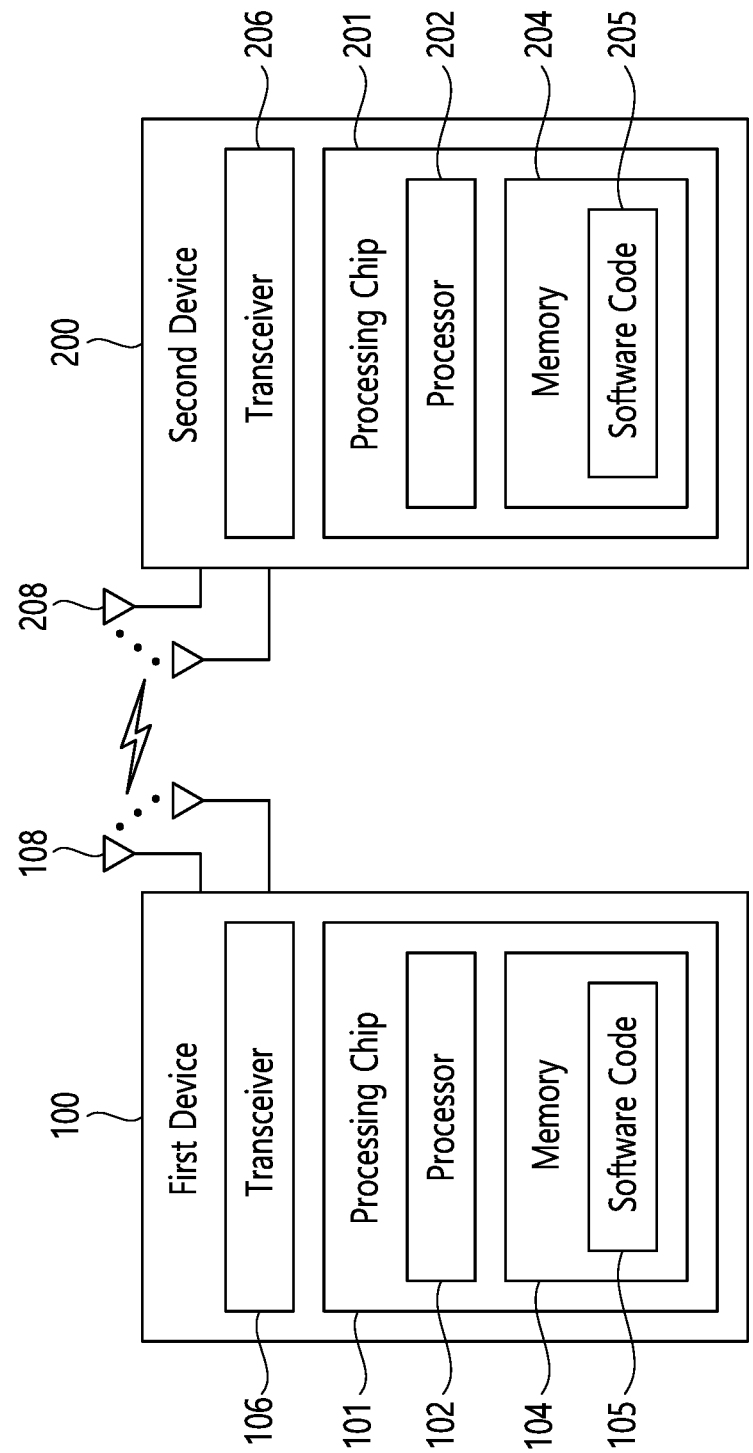
FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with Radio Frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, Media Access Control (MAC) layer, Radio Link Control (RLC) layer, Packet Data Convergence Protocol (PDCP) layer, Radio Resource Control (RRC) layer, and Service Data Adaptation Protocol (SDAP) layer). The one or more processors 102 and 202 may generate one or more Protocol Data Units (PDUs) and/or one or more Service Data Units (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands The one or more memories 104 and 204 may be configured by Read-Only Memories (ROMs), Random Access Memories (RAMs), Electrically Erasable Programmable ROMs (EEPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in UL and as a receiving device in DL. In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a Node B (NB), an eNode B (eNB), or a gNB.

Figure 3:
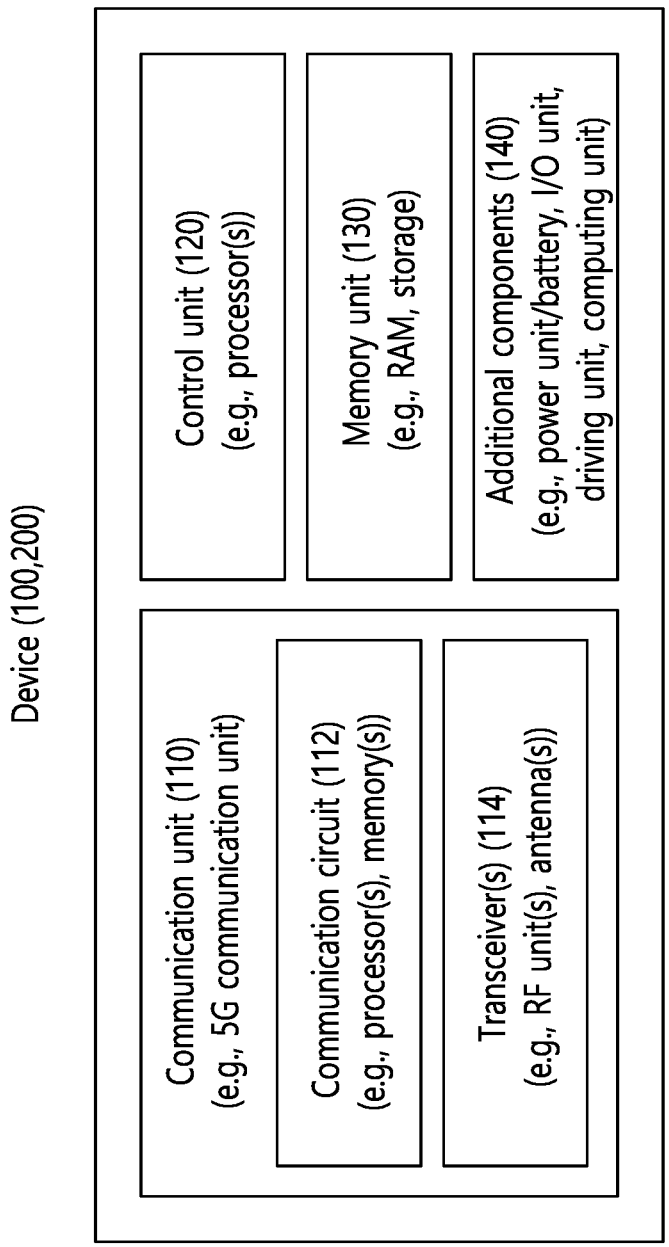
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, Input/Output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an Application Processor (AP), an Electronic Control Unit (ECU), a Central Processing Unit (CPU), a Graphical Processing Unit (GPU), and a memory control processor. As another example, the memory unit 130 may be configured by a RAM, a Dynamic RAM (DRAM), a ROM, a flash memory, a volatile memory, a non-volatile memory, and/or a combination thereof.

Figure 4:
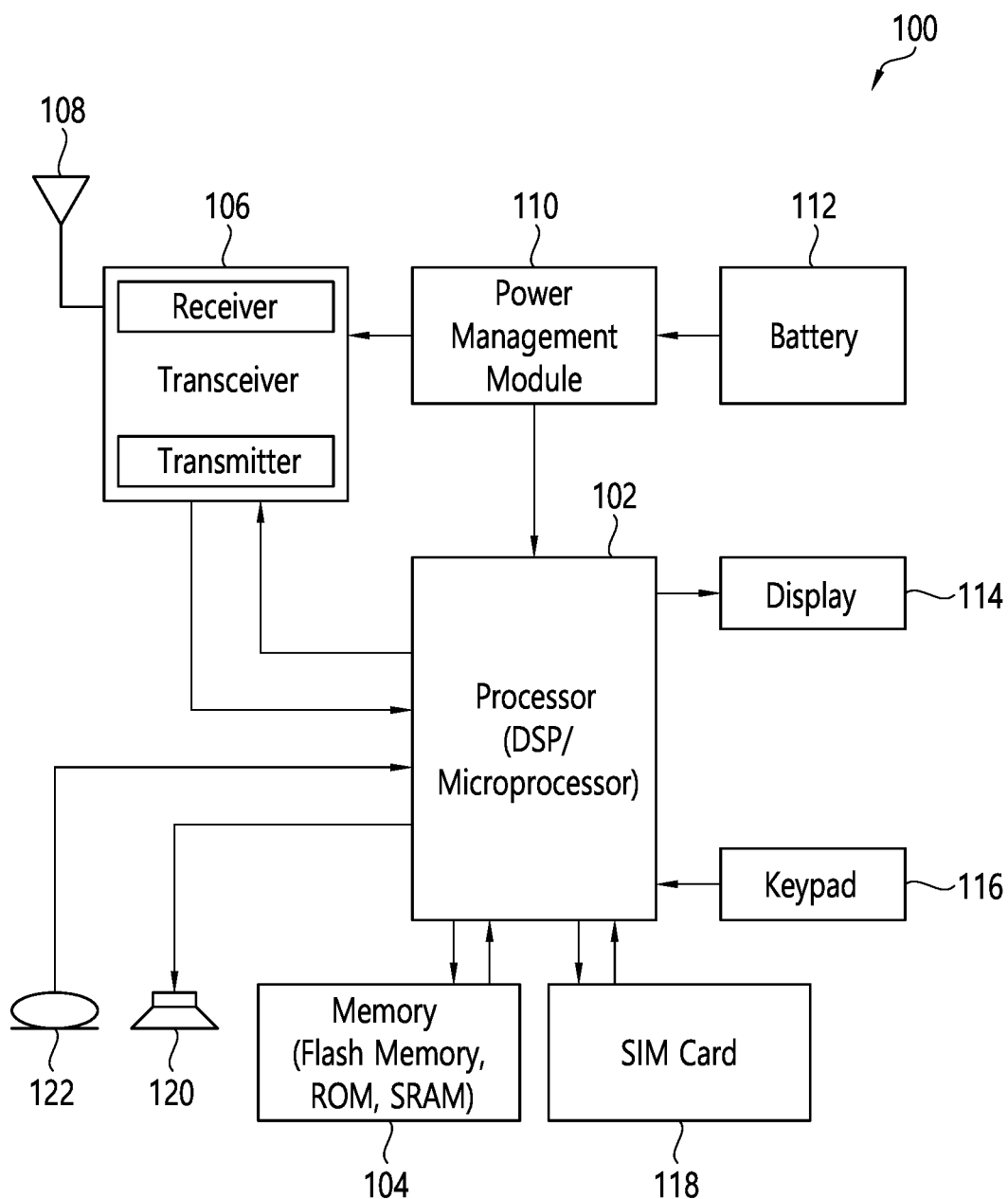
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a Subscriber Identification Module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of DSP, CPU, GPU, a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the International Mobile Subscriber Identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
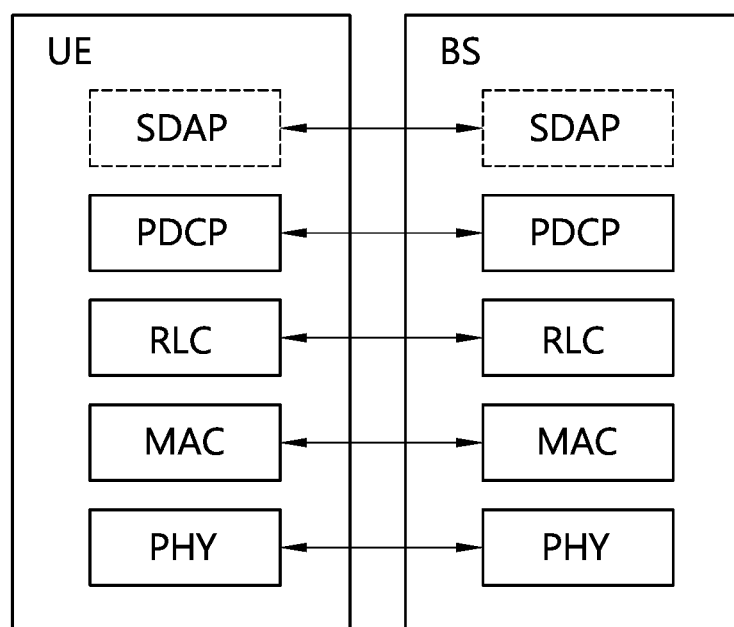
FIGS. 5 and 6 show an example of protocol stacks in a 3GPP based wireless communication system to which implementations of the present disclosure is applied.
Figure 6:
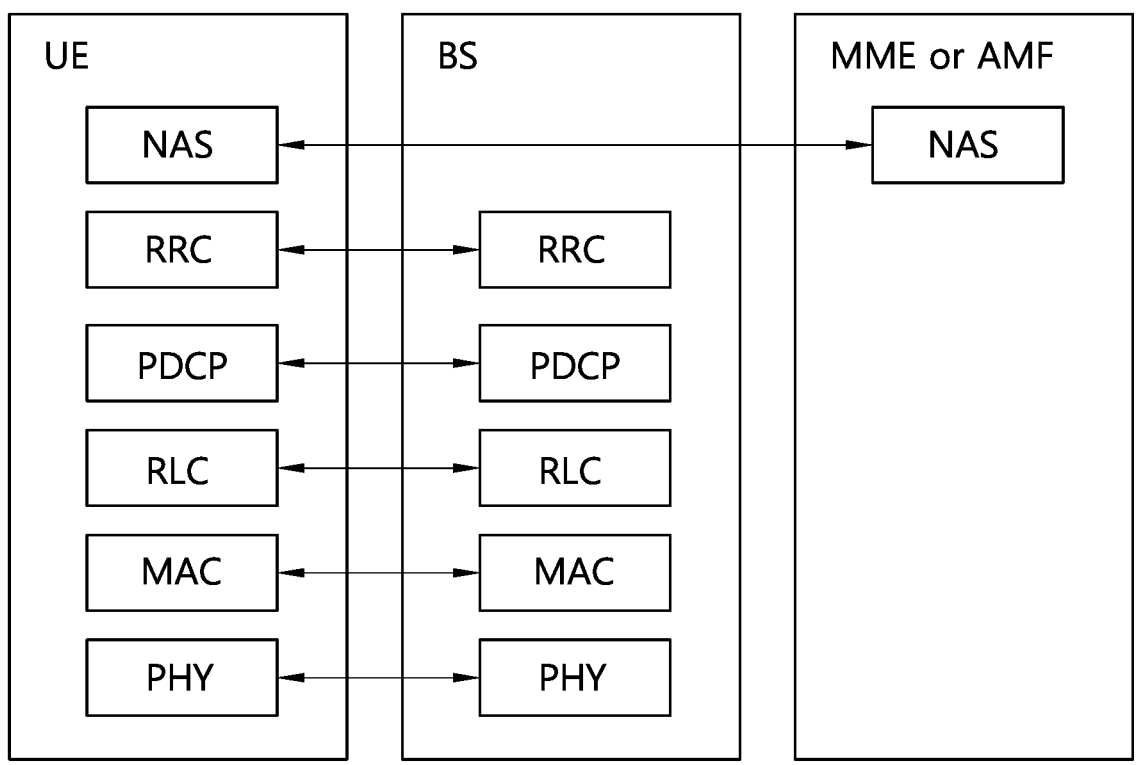

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a Non-Access Stratum (NAS) layer. Layer 1, Layer 2 and Layer 3 are referred to as an Access Stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network Quality of Service (QoS) flows.

In the 3GPP NR system, the main services and functions of the MAC sublayer include: mapping between logical channels and transport channels; multiplexing/de-multiplexing of MAC SDUs belonging to one or different logical channels into/from Transport Blocks (TB) delivered to/from the physical layer on transport channels; scheduling information reporting; error correction through Hybrid Automatic Repeat reQuest (HARQ) (one HARQ entity per cell in case of Carrier Aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast Control Channel (BCCH) is a downlink logical channel for broadcasting system control information, Paging Control Channel (PCCH) is a downlink logical channel that transfers paging information, system information change notifications and indications of ongoing Public Warning Service (PWS) broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In downlink, the following connections between logical channels and transport channels exist: BCCH can be mapped to Broadcast Channel (BCH); BCCH can be mapped to Downlink Shared Channel (DL-SCH); PCCH can be mapped to Paging Channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to Uplink Shared Channel (UL-SCH); DCCH can be mapped to UL-SCH; and DTCH can be mapped to UL-SCH.

The RLC sublayer supports three transmission modes: Transparent Mode (TM), Unacknowledged Mode (UM), and Acknowledged Mode (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using Robust Header Compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS Flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G Core network (5GC) or Next-Generation Radio Access Network (NG-RAN); establishment, maintenance and release of an RRC connection between the UE and NG-RAN; security functions including key management; establishment, configuration, maintenance and release of Signaling Radio Bearers (SRBs) and Data Radio Bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
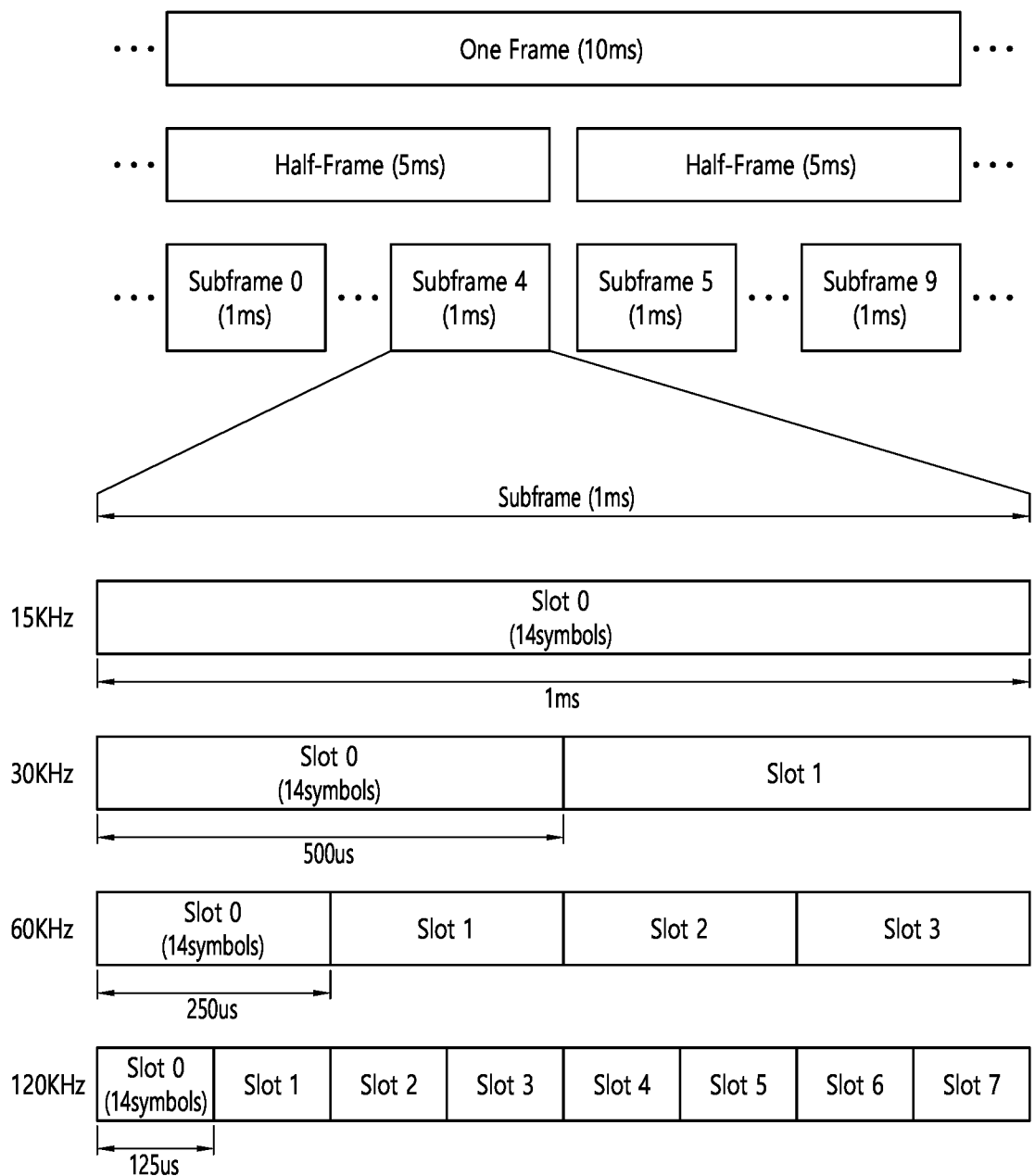
FIG. 7 shows a frame structure in a 3GPP based wireless communication system to which implementations of the present disclosure is applied.

FIG. 7 shows a frame structure in a 3GPP based wireless communication system to which implementations of the present disclosure is applied.

The frame structure shown in FIG. 7 is purely exemplary and the number of subframes, the number of slots, and/or the number of symbols in a frame may be variously changed. In the 3GPP based wireless communication system, OFDM numerologies (e.g., SCS, Transmission Time Interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or Cyclic Prefix (CP)-OFDM symbols), SC-FDMA symbols (or Discrete Fourier Transform-spread-OFDM (DFT-s-OFDM) symbols).

Referring to FIG. 7, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a CP. In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 3

| u | $N^{slot}_{symb}$ | $N^{frame,\,u}_{slot}$ | $N^{subframe,\,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 4

| u | $N^{slot}_{symb}$ | $N^{frame,\,u}_{slot}$ | $N^{subframe,\,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at Common Resource Block (CRB) $N^{start,u}_{grid}$ indicated by higher-layer signaling (e.g., RRC signaling), where $N^{size,u}_{grid,x}$ is the number of Resource Blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a Resource Element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and Physical Resource Blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a BandWidth Part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BPW,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL Component Carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell (SpCell). The configured set of serving cells for a UE therefore always consists of one PCell and one or more SCells. For Dual Connectivity (DC) operation, the term SpCell refers to the PCell of the Master Cell Group (MCG) or the Primary SCell (PSCell) of the Secondary Cell Group (SCG). An SpCell supports Physical Uplink Control Channel (PUCCH) transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 8:
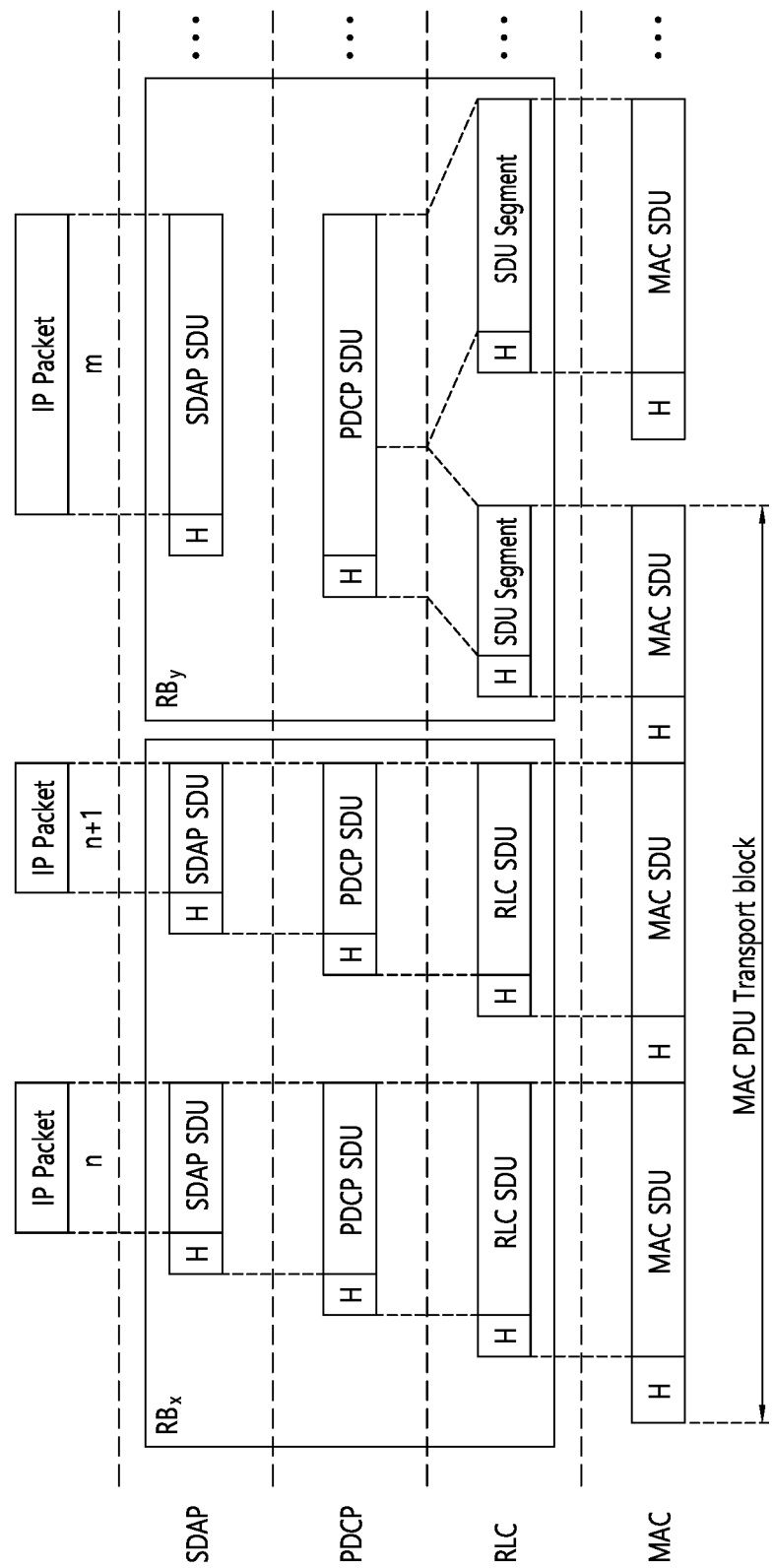
FIG. 8 shows a data flow example in the 3GPP NR system to which implementations of the present disclosure is applied.

FIG. 8 shows a data flow example in the 3GPP NR system to which implementations of the present disclosure is applied.

Referring to FIG. 8, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and Random Access Channel (RACH) are mapped to their physical channels Physical Uplink Shared Channel (PUSCH) and Physical Random Access Channel (PRACH), respectively, and the downlink transport channels DL-SCH, BCH and PCH are mapped to Physical Downlink Shared Channel (PDSCH), Physical Broadcast Channel (PBCH) and PDSCH, respectively. In the PHY layer, Uplink Control Information (UCI) is mapped to PUCCH, and Downlink Control Information (DCI) is mapped to Physical Downlink Control Channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Sidelink (SL) transmission and/or communication in 5G NR is described. Section 5.7 and Section 16.9 of 3GPP TS 38.300 V16.1.0 can be referred.

Figure 9:
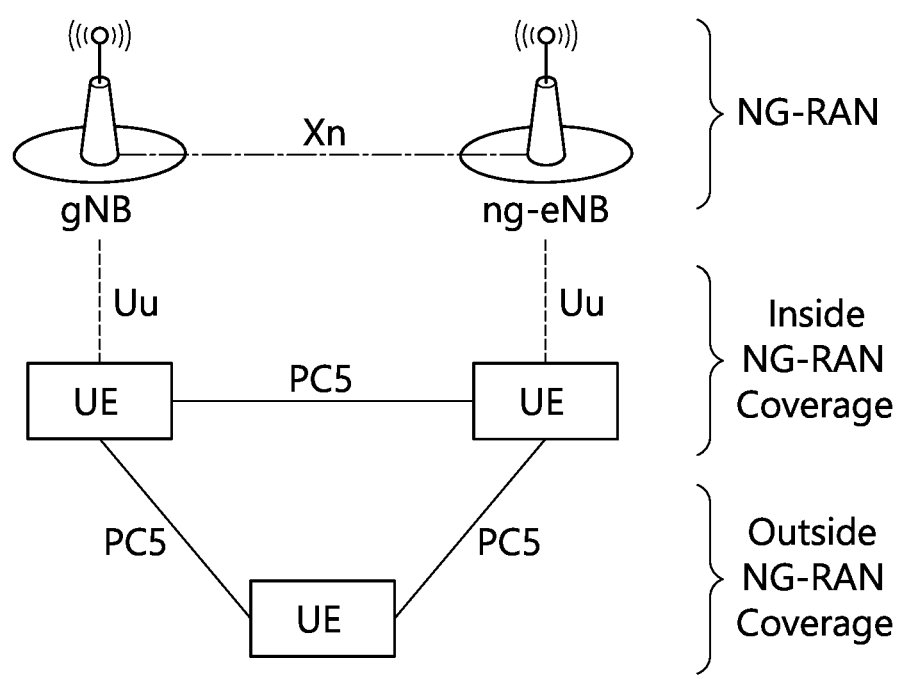
FIG. 9 shows an example of NG-RAN architecture supporting PC5 interface to which implementations of the present disclosure is applied.

FIG. 9 shows an example of NG-RAN architecture supporting PC5 interface to which implementations of the present disclosure is applied.

Referring to FIG. 9, sidelink transmission and reception over the PC5 interface are supported when the UE is inside NG-RAN coverage, irrespective of which RRC state the UE is in, and when the UE is outside NG-RAN coverage.

Support of V2X services via the PC5 interface can be provided by NR sidelink communication and/or V2X sidelink communication. NR sidelink communication may be used to support other services than V2X services.

NR sidelink communication can support one of three types of transmission modes for a pair of a Source Layer-2 ID and a Destination Layer-2 ID in the AS:

(1) Unicast transmission, characterized by:
  Support of one PC5-RRC connection between peer UEs for the pair;
  Transmission and reception of control information and user traffic between peer UEs in sidelink;
  Support of sidelink HARQ feedback;
  Support of RLC AM;
  Detection of radio link failure for the PC5-RRC connection.
(2) Groupcast transmission, characterized by:
  Transmission and reception of user traffic among UEs belonging to a group in sidelink;
  Support of sidelink HARQ feedback.
(3) Broadcast transmission, characterized by:
  Transmission and reception of user traffic among UEs in sidelink.

Two sidelink resource allocation modes are supported, i.e., mode 1 and mode 2. In mode 1, the sidelink resource allocation is provided by the network. In mode 2, UE decides the SL transmission resources and timing in the resource pool.

Mode 1, which may be called scheduled resource allocation, may be characterized by the following:
  The UE needs to be RRC_CONNECTED in order to transmit data;
  NG-RAN schedules transmission resources.

Mode 2, which may be called UE autonomous resource selection, may be characterized by the following:
  The UE can transmit data when inside NG-RAN coverage, irrespective of which RRC state the UE is in, and when outside NG-RAN coverage;
  The UE autonomously selects transmission resources from a pool of resources.

For NR sidelink communication, the UE performs sidelink transmissions only on a single carrier.

In mode 1, NG-RAN can dynamically allocate resources to the UE via the Sidelink Radio Network Temporary Identifier (SL-RNTI) on PDCCH(s) for NR sidelink communication.

In addition, NG-RAN can allocate sidelink resources to UE with two types of configured sidelink grants:
 With type 1, RRC directly provides the configured sidelink grant only for NR sidelink communication;
 With type 2, RRC defines the periodicity of the configured sidelink grant while PDCCH can either signal and activate the configured sidelink grant, or deactivate it. The PDCCH is addressed to SL Configured Scheduling RNTI (SL-CS-RNTI) for NR sidelink communication and SL semi-persistent scheduling V2X RNTI (V-RNTI) for V2X sidelink communication.

For the UE performing NR sidelink communication, there can be more than one configured sidelink grant activated at a time on the carrier configured for sidelink transmission When beam failure or physical layer problem occurs on NR Uu, the UE can continue using the configured sidelink grant type 1. During handover, the UE can be provided with configured sidelink grants via handover command, regardless of the type. If provided, the UE activates the configured sidelink grant type 1 upon reception of the handover command.

The UE can send Sidelink Buffer Status Report (SL BSR) to support scheduler operation in NG-RAN. The sidelink buffer status reports refer to the data that is buffered in for a group of Logical Channels (LCG) per destination in the UE. Eight LCGs are used for reporting of the sidelink buffer status reports. Two formats, which are SL BSR and truncated SL BSR, are used.

In mode 2, the UE autonomously selects sidelink grant from a pool of resources provided by broadcast system information or dedicated signalling while inside NG-RAN coverage or by pre-configuration while outside NG-RAN coverage.

For NR sidelink communication, the pools of resources can be provided for a given validity area where the UE does not need to acquire a new pool of resources while moving within the validity area, at least when this pool is provided by System Information Block (SIB) (e.g., reuse valid area of NR SIB). NR SIB validity mechanism is reused to enable validity area for SL resource pool configured via broadcasted system information.

The UE is allowed to temporarily use UE autonomous resource selection with random selection for sidelink transmission based on configuration of the exceptional transmission resource pool.

When a UE is inside NG-RAN coverage, NR sidelink communication and/or V2X sidelink communication can be configured and controlled by NG-RAN via dedicated signalling or system information:
 The UE should support and be authorized to perform NR sidelink communication and/or V2X sidelink communication in NG-RAN;
 If configured, the UE performs V2X sidelink communication unless otherwise specified;
 NG-RAN can provide the UE with intra-carrier sidelink configuration, inter-carrier sidelink configuration and anchor carrier which provides sidelink configuration via a Uu carrier for NR sidelink communication and/or V2X Sidelink communication;
 When the UE cannot simultaneously perform both NR sidelink transmission and NR uplink transmission in time domain, prioritization between both transmissions is done based on their priorities and thresholds configured by the NG-RAN.

When a UE is outside NG-RAN coverage, Sidelink Radio Bearer (SLRB) configuration are preconfigured to the UE for NR sidelink communication.

The UE in RRC_CONNECTED performs NR sidelink communication and/or V2X sidelink communication. The UE sends Sidelink UE Information to NG-RAN in order to request or release sidelink resources and report QoS information for each destination.

NG-RAN provides RRCReconfiguration to the UE in order to provide the UE with dedicated sidelink configuration. The RRCReconfiguration may include SLRB configuration for NR sidelink communication as well as either sidelink scheduling configuration or resource pool configuration. If UE has received SLRB configuration via system information, UE should continue using the configuration to perform sidelink data transmissions and receptions until a new configuration is received via the RRCReconfiguration.

NG-RAN may also configure measurement and reporting of Channel Busy Ratio (CBR) and reporting of location information to the UE via RRCReconfiguration.

During handover, the UE performs sidelink transmission and reception based on configuration of the exceptional transmission resource pool or configured sidelink grant type 1 and reception resource pool of the target cell as provided in the handover command.

The UE in RRC_IDLE or RRC_INACTIVE performs NR sidelink communication and/or V2X sidelink communication. NG-RAN may provide common sidelink configuration to the UE in RRC_IDLE or RRC_INACTIVE via system information for NR sidelink communication and/or V2X sidelink communication. UE receives resource pool configuration and SLRB configuration via SIB12 for NR sidelink communication, and/or resource pool configuration via SIB13 and SIB14 for V2X sidelink communication. If UE has received SLRB configuration via dedicated signalling, UE should continue using the configuration to perform sidelink data transmissions and receptions until a new configuration is received via system information.

When the UE performs cell reselection, the UE interested in V2X service(s) considers at least whether NR sidelink communication and/or V2X sidelink communication are supported by the cell. The UE may consider the following carrier frequency as the highest priority frequency, except for the carrier only providing the anchor carrier:
 the frequency providing both NR sidelink communication and V2X sidelink communication, if configured to perform both NR sidelink communication and V2X sidelink communication;
 the frequency providing NR sidelink communication, if configured to perform only NR sidelink communication.

Radio protocol architecture for NR sidelink communication may be as follows.
 The AS protocol stack for the control plane in the PC5 interface consists of RRC, PDCP, RLC and MAC sublayers, and the physical layer.
 For support of PC5-S protocol, PC5-S is located on top of PDCP, RLC and MAC sublayers, and the physical layer for the control plane in the PC5 interface.
 The AS protocol stack for SBCCH in the PC5 interface consists of RRC, RLC, MAC sublayers, and the physical layer.

The AS protocol stack for user plane in the PC5 interface consists of SDAP, PDCP, RLC and MAC sublayers, and the physical layer.

SLRB are categorized into two groups: Sidelink Data Radio Bearers (SL DRB) for user plane data and Sidelink Signalling Radio Bearers (SL SRB) for control plane data. Separate SL SRBs using different SCCHs are configured for PC5-RRC and PC5-S signaling respectively.

Physical Sidelink Control Channel (PSCCH) indicates resource and other transmission parameters used by a UE for PSSCH. PSCCH transmission is associated with a De-Modulation Reference Signal (DM-RS).

Physical Sidelink Shared Channel (PSSCH) transmits the TBs of data themselves, and control information for HARQ procedures and Channel State Information (CSI) feedback triggers, etc. At least 5 OFDM symbols within a slot are used for PSSCH transmission. PSSCH transmission is associated with a DM-RS and may be associated with a Phase Tracking Reference Signal (PT-RS).

Physical Sidelink Feedback Channel (PSFCH) carries HARQ feedback over the sidelink from a UE which is an intended recipient of a PSSCH transmission to the UE which performed the transmission. PSFCH sequence is transmitted in one PRB repeated over two OFDM symbols near the end of the sidelink resource in a slot.

The sidelink synchronization signal consists of Sidelink Primary and Sidelink Secondary Synchronization Signals (S-PSS, S-SSS), each occupying 2 symbols and 127 subcarriers. Physical Sidelink Broadcast Channel (PSBCH) occupies 7 and 5 symbols for normal and extended cyclic prefix cases respectively, including the associated DM-RS.

Sidelink HARQ feedback uses PSFCH and can be operated in one of two options. In one option, PSFCH transmits either Acknowledgement (ACK) or Negative ACK (NACK) using a resource dedicated to a single PSFCH transmitting UE. In another option, PSFCH transmits NACK, or no PSFCH signal is transmitted, on a resource that can be shared by multiple PSFCH transmitting UEs.

In sidelink resource allocation mode 1, a UE which received PSFCH can report sidelink HARQ feedback to gNB via PUCCH or PUSCH.

For unicast, CSI Reference Signal (CSI-RS) is supported for CSI measurement and reporting in sidelink. A CSI report is carried in a MAC Control Element (CE).

The MAC sublayer provides the following services and functions over the PC5 interface in addition to the services and functions described above by referring to FIGS. 5 and 6.

Radio resource selection;
Packet filtering;
Priority handling between uplink and sidelink transmissions for a given UE;
Sidelink CSI reporting.

With Logical Channel Prioritization (LCP) restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant type 1.

For packet filtering, a SL-SCH MAC header including portions of both Source Layer-2 ID and a Destination Layer-2 ID is added to each MAC PDU. Logical channel ID (LCID) included within a MAC subheader uniquely identifies a logical channel within the scope of the Source Layer-2 ID and Destination Layer-2 ID combination.

The following logical channels are used in sidelink:
Sidelink Control Channel (SCCH): a sidelink channel for transmitting control information from one UE to other UE(s);
Sidelink Traffic Channel (STCH): a sidelink channel for transmitting user information from one UE to other UE(s);
Sidelink Broadcast Control Channel (SBCCH): a sidelink channel for broadcasting sidelink system information from one UE to other UE(s).

The following connections between logical channels and transport channels exist:
SCCH can be mapped to Sidelink Shared Channel (SL-SCH);
STCH can be mapped to SL-SCH;
SBCCH can be mapped to Sidelink Broadcast Channel (SL-BCH).

The RRC sublayer provides the following services and functions over the PC5 interface:
Transfer of a PC5-RRC message between peer UEs;
Maintenance and release of a PC5-RRC connection between two UEs;
Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established. There is one-to-one correspondence between the PC5-RRC connection and the PC5 unicast link. A UE may have multiple PC5-RRC connections with one or more UEs for different pairs of Source and Destination Layer-2 IDs.

Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions.

If it is not interested in sidelink transmission, if sidelink Radio Link Failure (RLF) on the PC5-RRC connection is declared, or if the Layer-2 link release procedure is completed or if the T400 is expired, UE releases the PC5-RRC connection.

Sidelink resource allocation is described in detail. If the transmitting UE (e.g., TX UE) is in RRC_CONNECTED and configured for gNB scheduled sidelink resource allocation (e.g., mode 1), the TX UE may transmit sidelink UE information including traffic pattern of Service, TX carriers and/or RX carriers mapped to service, QoS information related to service (e.g., 5G QoS Identifier (5QI), ProSe-Per-Packet Priority (PPPP), ProSe-Per-Packet reliability (PPPR), QoS Class Identifier (QCI) value), and destination related to service.

After receiving the sidelink UE information, the gNB constructs sidelink configuration at least including one or more resource pools for service and sidelink BSR configuration. The gNB signals the sidelink configuration to the TX UE and then the TX UE configures lower layers with sidelink configuration.

If a message becomes available in L2 buffer for sidelink transmission, the TX UE triggers Scheduling Request (SR), so that the TX UE transmits PUCCH resource. If PUCCH resource is not configured, the TX UE performs random access procedure as the SR. If an uplink grant is given at a result of the SR, the TX UE transmits sidelink BSR to the gNB. The sidelink BSR indicates at least a destination index, a LCG, and a buffer size corresponding to the destination.

After receiving the sidelink BSR, the gNB transmits a sidelink grant to the TX UE, e.g., by sending DCI in PDCCH. The DCI may include an allocated sidelink resource. If the TX UE receives the DCI, the TX UE uses the sidelink grant for transmission to the receiving UE (e.g., RX UE).

Alternatively, if the TX UE is configured for UE autonomous scheduling of sidelink resource allocation (e.g., mode 2) regardless of RRC state, the TX UE autonomously select or reselect sidelink resources to create a sidelink grant used for transmission to the RX UE.

For sidelink resource allocation mode 2 (i.e., UE autonomous resource selection), UE autonomously reserves a set of resources on a pool of resources. Even though how to reserve resources is controlled by some parameters configured by the network, some aspects may be left to UE implementation. Thus, some UEs may eagerly/aggressively reserve resources, which may cause severe interference in transmissions from different UEs and/or prevent other UEs from performing transmissions.

Meanwhile, in 5G NR sidelink, a maximum number of transmissions (for configured grant for sidelink resource allocation mode 1) and/or Channel occupancy Ratio (CR) limit (for sidelink resource allocation mode 1) may be set to prevent UE from using resources unnecessarily. If both sidelink resource allocation mode 1 and sidelink resource allocation mode 2 are to be supported simultaneously in 5G NR, the resource directly allocated from the base station (for sidelink resource allocation mode 1) and the resource autonomously reserved by UE (for sidelink resource allocation mode 1) may coexist. In this case, there is a need for a method in which the base station can additionally allocate retransmission resources when the reserved resources are exhausted.

According to implementations of the present disclosure, UE may be configured with a pool of resources, may autonomously select a set of resources for N number of transmission(s) of a TB.

According to implementations of the present disclosure, if N number of transmission(s) of the TB is completed and additional retransmission of the TB is required, UE may request a retransmission grant to the network. The request may be transmitted on PUCCH or UCI or PUSCH. For example, the request may be transmitted via HARQ NACK. If PDB of the TB expires and/or the number of retransmissions for the TB has been reached, UE may send HARQ ACK.

According to implementations of the present disclosure, upon receiving the retransmission grant from the network, UE may perform additional retransmission of the TB by using the retransmission grant. The transmission may be either sidelink transmission or uplink transmission. The retransmission grant may be received in DCI on PDCCH.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 10:
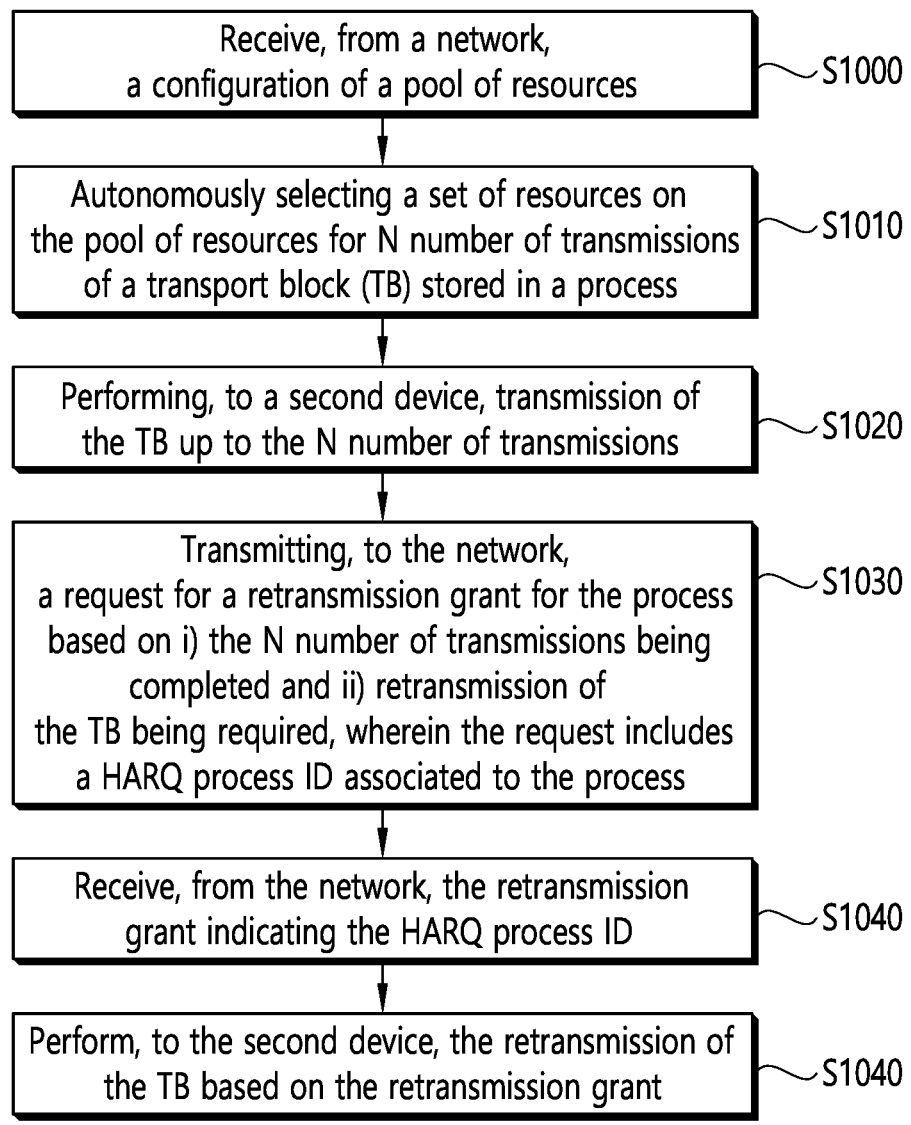
FIG. 10 shows an example of a method performed by a first device to which implementation of the present disclosure is applied.

FIG. 10 shows an example of a method performed by a first device to which implementation of the present disclosure is applied.

In step S1000, the method includes receiving, from a network, a configuration of a pool of resources.

In step S1010, the method includes autonomously selecting a set of resources on the pool of resources for N number of transmissions of a TB stored in a process.

In some implementations, the selected set of resources may be indicated to the network.

In step S1020, the method includes performing, to a second device, transmission of the TB up to the N number of transmissions.

In step S1030, the method includes transmitting, to the network, a request for a retransmission grant for the process based on i) the N number of transmission being completed and ii) retransmission of the TB being required. The request includes a HARQ process ID associated to the process.

In some implementations, the retransmission of the TB may be required based on i) the transmission of the TB being not positively acknowledged from the second device, and/or ii) a PDB of the TB still remains.

In some implementations, the request for the retransmission grant may be transmitted via a PUCCH or UCI and/or a MAC CE. The PUCCH or the UCI and/or the MAC CE may be configured per device and/or per pool of resources.

In some implementations, the request for the retransmission grant may correspond to a HARQ NACK.

In step S1040, the method includes receiving, from the network, the retransmission grant indicating the HARQ process ID.

In some implementations, any retransmission grant which has been reserved by the first device may be cleared based on receiving the retransmission grant.

In step S1050, the method includes performing, to the second device, the retransmission of the TB based on the retransmission grant.

In some implementations, the first device may be a first wireless device, and the second device may be a base station. Or, the first device may be a first wireless device, and the second device may be a second wireless device.

In some implementations, the first device may be in communication with at least one of a mobile device, a network, and/or autonomous vehicles other than the first device.

Furthermore, the method in perspective of the first device described above in FIG. 10 may be performed by the first wireless device 100 shown in FIG. 2, the wireless device 100 shown in FIG. 3, and/or the UE 100 shown in FIG. 4.

More specifically, the first device comprises at least one transceiver, at least one processor, and at least one memory operably connectable to the at least one processor and storing instructions that, based on being executed by the at least one processor, perform operations below.

The first device receives, from a network via the at least one transceiver, a configuration of a pool of resources.

The first device autonomously selects a set of resources on the pool of resources for N number of transmissions of a TB stored in a process.

In some implementations, the selected set of resources may be indicated to the network.

The first device performs, to a second device via the at least one transceiver, transmission of the TB up to the N number of transmissions.

The first device transmits, to the network via the at least one transceiver, a request for a retransmission grant for the process based on i) the N number of transmission being completed and ii) retransmission of the TB being required. The request includes a HARQ process ID associated to the process.

In some implementations, the retransmission of the TB may be required based on i) the transmission of the TB being not positively acknowledged from the second device, and/or ii) a PDB of the TB still remains.

In some implementations, the request for the retransmission grant may be transmitted via a PUCCH or UCI and/or a MAC CE. The PUCCH or the UCI and/or the MAC CE may be configured per device and/or per pool of resources.

In some implementations, the request for the retransmission grant may correspond to a HARQ NACK.

The first device receives, from the network via the at least one transceiver, the retransmission grant indicating the HARQ process ID.

In some implementations, any retransmission grant which has been reserved by the first device may be cleared based on receiving the retransmission grant.

The first device performs, to the second device via the at least one transceiver, the retransmission of the TB based on the retransmission grant.

Furthermore, the method in perspective of the first device described above in FIG. 10 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system (e.g., first device) comprises at least one processor, and at least one memory operably connectable to the at least one processor. The at least one processor is configured to perform operations comprising: obtaining a configuration of a pool of resources, autonomously selecting a set of resources on the pool of resources for N number of transmissions of a TB stored in a process, generating a request for a retransmission grant for the process based on i) the N number of transmission being completed and ii) retransmission of the TB being required, wherein the request includes a HARQ process ID associated to the process, and obtaining the retransmission grant indicating the HARQ process ID.

Furthermore, the method in perspective of the first device described above in FIG. 10 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: obtaining a configuration of a pool of resources, autonomously selecting a set of resources on the pool of resources for N number of transmissions of a TB stored in a process, generating a request for a retransmission grant for the process based on i) the N number of transmission being completed and ii) retransmission of the TB being required, wherein the request includes a HARQ process ID associated to the process, and obtaining the retransmission grant indicating the HARQ process ID.

Figure 11:
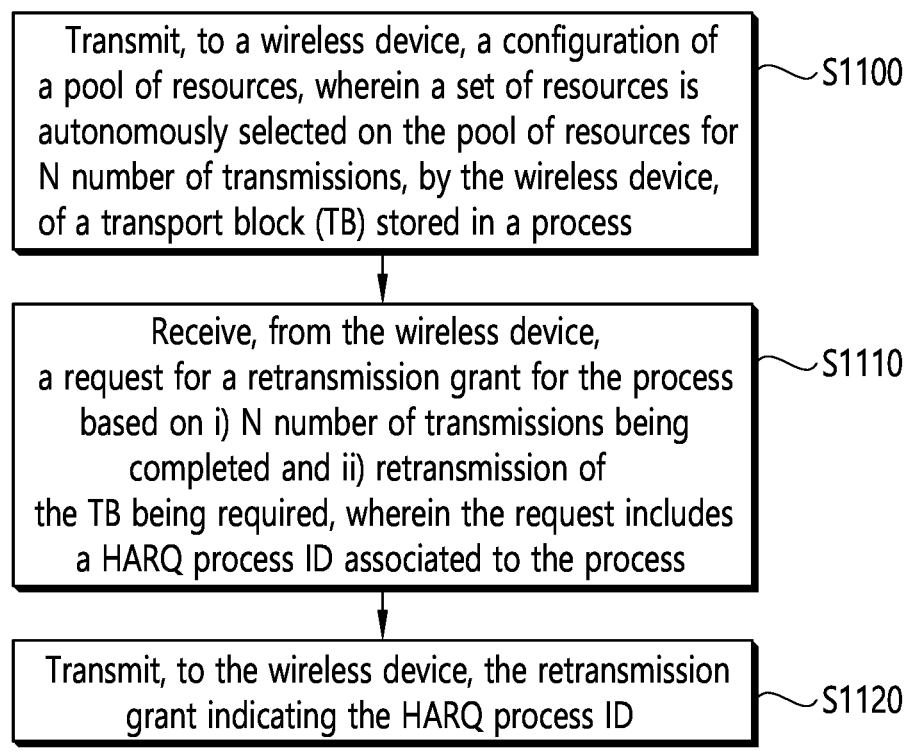
FIG. 11 shows an example of a method performed by a network node to which implementation of the present disclosure is applied.

FIG. 11 shows an example of a method performed by a network node to which implementation of the present disclosure is applied.

In step S1100, the method includes transmitting, to a wireless device, a configuration of a pool of resources. A set of resources is autonomously selected on the pool of resources for N number of transmissions, by the wireless device, of a TB stored in a process.

In step S1110, the method includes receiving, from the wireless device, a request for a retransmission grant for the process based on i) the N number of transmission being completed and ii) retransmission of the TB being required. The request includes a HARQ process ID associated to the process.

In some implementations, the retransmission of the TB may be required based on i) the transmission of the TB being not positively acknowledged from the second device, and/or ii) a PDB of the TB still remains.

In some implementations, the request for the retransmission grant may be received via a PUCCH or UCI and/or a MAC CE. The PUCCH or the UCI and/or the MAC CE may be configured per device and/or per pool of resources.

In some implementations, the request for the retransmission grant may correspond to a HARQ NACK.

In step S1120, the method includes transmitting, to the wireless device, the retransmission grant indicating the HARQ process ID.

Furthermore, the method in perspective of the network node described above in FIG. 11 may be performed by the second wireless device 200 shown in FIG. 2, and/or the wireless device 100 shown in FIG. 3.

More specifically, the network node comprises at least one transceiver, at least one processor, and at least one memory operably connectable to the at least one processor and storing instructions that, based on being executed by the at least one processor, perform operations below.

The network node transmits, to a wireless device via the at least one transceiver, a configuration of a pool of resources. A set of resources is autonomously selected on the pool of resources for N number of transmissions, by the wireless device, of a TB stored in a process.

The network node receives, from the wireless device via the at least one transceiver, a request for a retransmission grant for the process based on i) the N number of transmission being completed and ii) retransmission of the TB being required. The request includes a HARQ process ID associated to the process.

In some implementations, the retransmission of the TB may be required based on i) the transmission of the TB being not positively acknowledged from the second device, and/or ii) a PDB of the TB still remains.

In some implementations, the request for the retransmission grant may be received via a PUCCH or UCI and/or a MAC CE. The PUCCH or the UCI and/or the MAC CE may be configured per device and/or per pool of resources.

In some implementations, the request for the retransmission grant may correspond to a HARQ NACK.

The network node transmits, to the wireless device via the at least one transceiver, the retransmission grant indicating the HARQ process ID.

Figure 12:
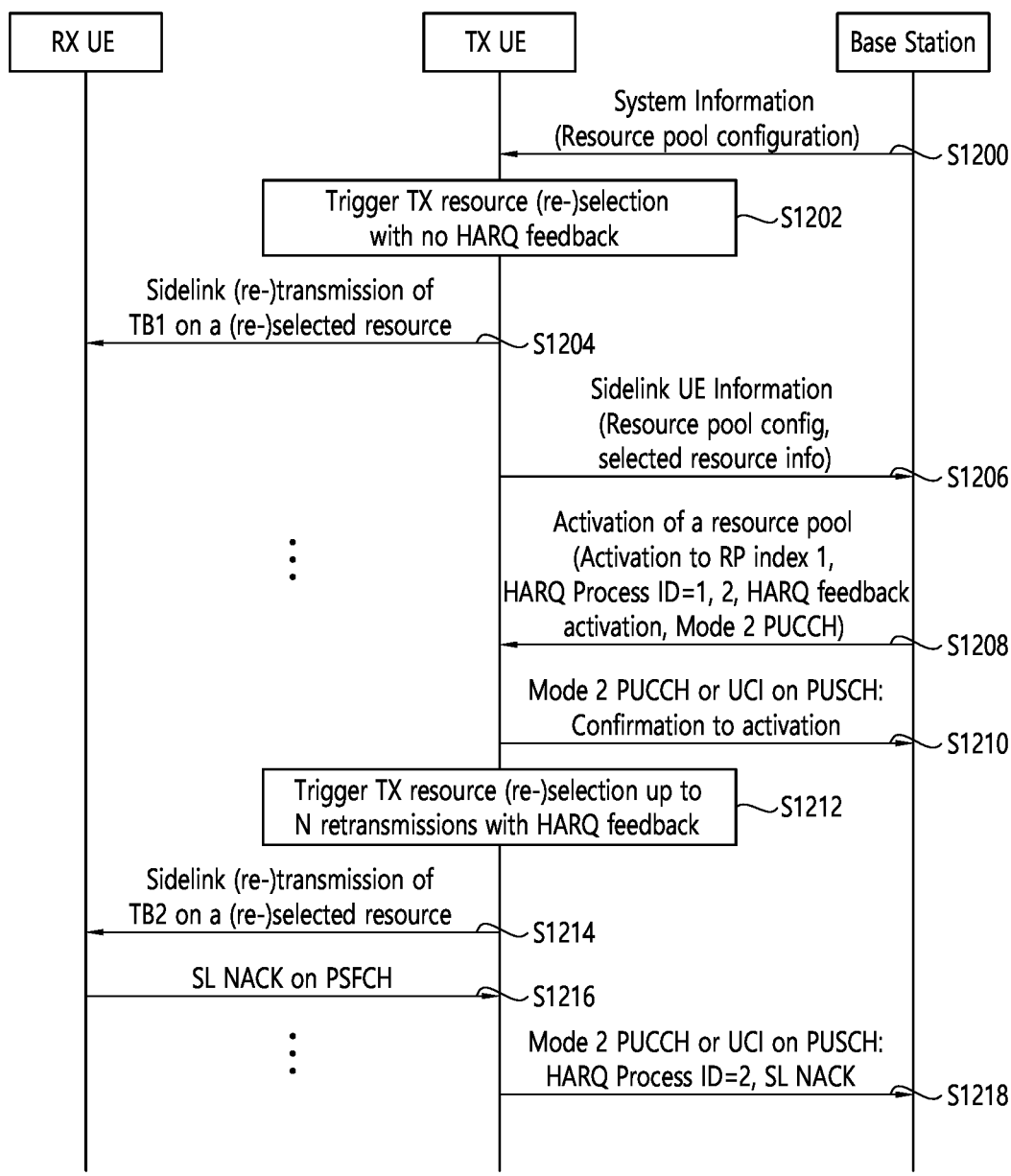
FIGS. 12 and 13 shows an example of sidelink retransmissions to which implementation of the present disclosure is applied.
Figure 13:
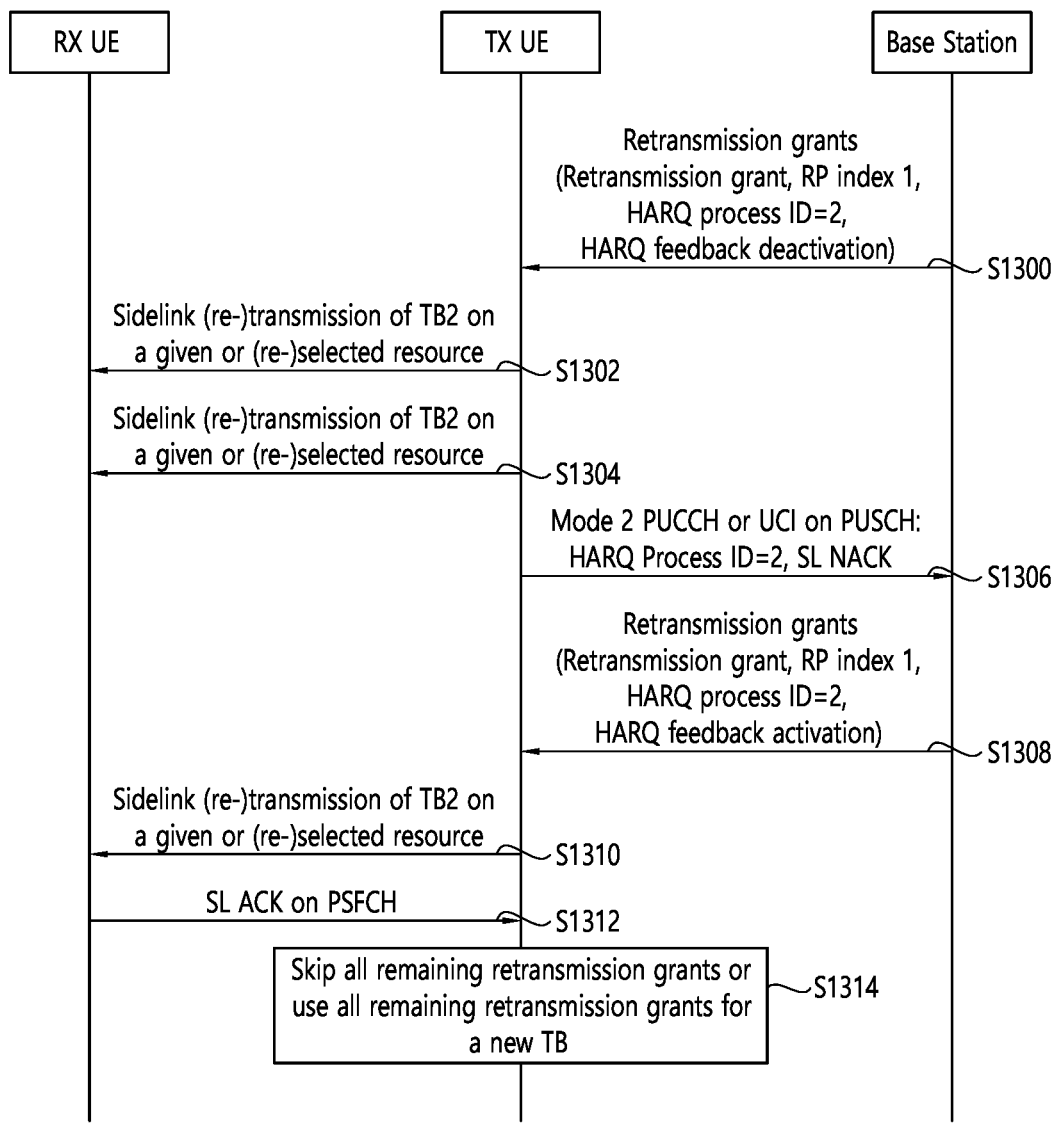

FIGS. 12 and 13 shows an example of sidelink retransmissions to which implementation of the present disclosure is applied.

First, FIG. 12 is described.

In steps S1200, the network may sidelink configuration to TX UE via system information and/or UE-dedicated signaling. Upon receiving the sidelink configuration from the network, TX UE may be configured with one or more carriers and/or one or more pools of resources on each carrier for sidelink resource allocation mode 1 (i.e., scheduled resource allocation) or sidelink resource allocation mode 2 (i.e., UE autonomous resource selection) or both. The number of HARQ processes may be configured for each of pools of resources on each carrier.

In some implementations, the pool of resources may be used for either uplink or sidelink transmission.

In some implementations, the pool of resources may be include at least one of a configured grant, such as configured grant Type 1 or 2 or a selected grant.

In some implementations, each pool of resources may be associated with a pool index.

In some implementations, the maximum number of HARQ processes for each pool of resources may be configured.

In some implementations, the number of HARQ retransmissions may correspond to each of numbers of HARQ processes and/or either SL Reference Signal Received Power (RSRP) or DL RSRP measured by UE.

In addition, TX UE may be configured with one or more configured grants for sidelink resource allocation mode 1 by the network.

In some implementations, the configured grant may be used for either uplink or sidelink transmission.

In some implementations, the configured grant may consist of periodic transmission occasions.

In some implementations, one configured pool of resources may be associated to a particular configured grant.

In some implementations, in one period of the configured grant, one or more resources may be configured for one or more uplink and/or sidelink transmissions of a single TB, i.e., one MAC PDU.

In some implementations, one or more of the configured grant may be mapped to logical channels and/or a MAC CE of the destination ID. The MAC CE may carry sidelink CSI reporting.

In some implementations, a set of PSCCH/PSSCH resources may periodically occur for each configured grant. TX UE can perform sidelink transmission(s) by using the set of PSCCH/PSSCH resources for each period of the configured grant. TX UE may perform one transmission of a TB (Transport Block) by using one PSCCH/PSSCH resource. For each period, only one TB can be transmitted in each period.

In step S1202, TX UE may trigger TX resource (re-)selection. TX UE may select and/or reselect one of sidelink carriers and one of the configured pools of resources on the (re-)selected carrier for a SL SRB based on the sidelink configuration (e.g. resource pool configuration).

For example, in FIG. 12, TX UE may trigger TX resource (re-)selection with no HARQ feedback.

In some implementations, then, TX UE may send a direct communication request message to RX UE over the SL-SRB. The direct communication request message may include the sidelink configuration (e.g., resource pool configuration) that TX UE received from the network, and/or the information on the selected resource.

In some implementations, upon receiving the direct communication request message from TX UE, RX UE may select and/or reselects one of sidelink carriers and/or one of the configured pools of resources on the (re-)selected carrier for a SL-SRB based on the sidelink configuration (e.g., resource pool configuration). Then, RX UE may send the direct communication response message to TX UE over the SL-SRB in response to the direct communication request message. The direct communication response message may include the sidelink configuration (e.g., resource pool configuration) that RX UE received from the network.

By exchange of the above messages, i.e., direct communication request/response messages, TX UE may establish a PC5-S unicast link and/or the associated PC5-RRC connection with RX UE for relay connection.

In step S1204, TX UE may perform sidelink transmissions of TB1 on a selected resource to RX UE.

In step S1206, if data is available for a logical channel configured for sidelink resource allocation mode 2, TX UE may select and/or reselect one of sidelink carriers and/or one of the configured pools of resources on the (re-)selected carrier for the logical channel TX UE may create a selected sidelink grant in sidelink resource allocation mode 2. TX UE may inform the network about the selected pool of the resources and/or the selected sidelink grant via e.g., PUCCH or UCI or UL MAC CE or UL RRC message.

In some implementations, the logical channel may be configured for sidelink resource allocation mode 2 depending on at least one of enabling/disabling of HARQ feedback and/or cast type and/or destination and/or logical channel priority and/or QoS characteristics. For example, if the logical channel is for broadcast, and/or if TX UE is outside the communication range of the logical channel, and/or if the logical channel corresponds to delay-sensitive service or a particular priority, e.g., higher (or lower) priority than a threshold (i.e., prioritized), TX UE may create a selected sidelink grant in sidelink resource allocation mode 2.

In step S1208, after informing the network about the selected pool of the resources and/or the selected sidelink grant, TX UE may monitor PDCCH. If DCI is carried on the PDCCH, a particular RNTI may be configured by the network and used to scramble Cyclic Redundancy Check (CRC) associated to the DCI on the PDCCH.

In some implementations the DCI may include one or more of the following elements:
An indication related to activation or deactivation (or release) of a particular pool of resources, i.e., pool index;
An indication related to either transmissions of multiple MAC PDUs or transmission of single MAC PDU;

An indication related to sidelink resource allocation mode 1 or sidelink resource allocation mode 2 for the pool of resources;

An indication related to request of retransmission grant for sidelink resource allocation mode 2, if a pool of resources for sidelink resource allocation mode 2 is activated and/or configured.

An indication related to the number of activated and/or deactivated HARQ processes associated to the particular pool of resources and/or an indication related to one or more of the activated and/or deactivated HARQ processes associated to the particular pool of resources;

The resource reservation interval(s) used for a resource reservation procedure (or, resource reselection procedure) on the pool of resources;

The number(s) of HARQ retransmissions used for a resource reservation procedure (or, resource reselection procedure) on the pool of resources;

The MCS value(s) used for transmission of a particular MAC PDU on the pool of resources;

The number(s) of subchannels used for a resource reservation procedure (or, resource reselection procedure) on the pool of resources;

The number of symbols in a slot used for a resource reservation procedure (or, resource reselection procedure) on the pool of resources;

The value(s) of SL_RESOURCE_RESELECTION_COUNTER used for a resource reservation procedure (or, resource reselection procedure) on the pool of resources;

The value of sl-ProbResourceKeep used for triggering a resource reselection on the pool of resources;

The value of sl-ReselectAfter used for triggering a resource reselection on the pool of resources;

The offset used to calculate HARQ process ID(s);

The offset of a resource with respect to SFN=0 in time domain;

Time and/or frequency resource location;

The CBR measured by the network or reported by a UE;

The value of p_preemption used for a resource reservation procedure (or, resource reselection procedure) on the pool of resources;

The value of any parameter used for resource reservation and/or resource reselection on the pool of resources;

Activation and/or deactivation of PUCCH carrying SL HARQ feedback and/or PUCCH resource configuration for sidelink resource allocation mode 1 or mode 2;

UL resource for activation confirmation and/or deactivation confirmation, e.g., PUCCH resource and/or PUSCH resource.

For example, in step S1208, TX UE may receive, from the network, an indication related to activation of a resource pool index 1, an indication related to HARQ processes having HARQ process ID=1 and 2 associated to the particular pool of resources, indication related to HARQ feedback activation, and indication related to Mode 2 PUCCH.

In some implementations, upon receiving the DCI from the network, TX UE may activate and/or deactivate the particular pool of resources according to the DCI.

For example, TX UE may monitor PDCCH to receive DCI with the particular RNTI. Or, TX UE may monitor PSCCH to receive SCI only on the indicated pool of resources.

In step S1210, upon (re-)activation of the particular pool of resources for transmission of multiple MAC PDUs, TX UE may activate the pool of resources for one or more of the indicated HARQ processes up to the number of HARQ processes. TX UE may send activation confirmation to the network by using the UL resource received from the network.

In step S1212, TX UE may trigger the resource reservation procedure in which TX UE periodically reserves a set of transmission opportunities on the pool of resources to create a selected sidelink grant for transmissions of multiple MAC PDUs according to the at least one element included in the received DCI mentioned above. If PUCCH is configured for a pool of resources to send SL HARQ feedback to the network in sidelink resource allocation mode 2, TX UE may reserve at least N transmission opportunities before every PUCCH transmission occasion for each HARQ process or for one or more HARQ processes for the selected sidelink grant. N may be equal to one or more.

In some implementations, in the resource reservation procedure, TX UE may select at least one of one of the indicated resource reservation interval(s), one of the indicated number(s) of HARQ retransmissions, one of the indicated number(s) of subchannels, the indicated number of symbols in a slot, the indicated CBR. If a particular element was not indicated by the DCI, TX UE may select one according to configuration related to pool(s) of resources previously received by the network. If CBR is not indicated by the DCI, TX UE may select one according to the CBR measured by TX UE. Then, TX UE may periodically reserve a set of transmission opportunities according to the selection.

In some implementations, for each transmission opportunity, TX UE may select one of the indicated MCS value(s) according to the indicated CBR and then may transmit a MAC PDU with the selected MCS value. If CBR is not indicated by the DCI, TX UE may select one according to the CBR measured by TX UE.

Alternatively, in step S1210, upon (re-)activation of the particular pool of resources for transmission of a single MAC PDU, TX UE may activate the pool of resources for one or more of the indicated HARQ processes up to the number of HARQ processes. TX UE may send activation confirmation to the network by using the UL resource received from the network.

In step S1212, TX UE may trigger the resource reservation procedure in which TX UE reserves a set of transmission opportunities on the pool of resources for each of the indicated HARQ processes for transmission of a single MAC PDU according to the at least one element included in the received DCI mentioned above. TX UE may consider the set of transmission opportunities as a selected sidelink grant.

In some implementations, in the resource reservation procedure, TX UE may select at least one of one of the indicated resource reservation interval(s), one of the indicated number(s) of HARQ retransmissions, one of the indicated number(s) of subchannels, the indicated number of symbols in a slot, the indicated CBR. If a particular element was not indicated by the DCI, TX UE may select one according to configuration related to pool(s) of resources previously received by the network. If CBR is not indicated by the PDCCH, TX UE may select one according to the CBR measured by TX UE. Then, TX UE may reserve a set of transmission opportunities for initial and/or retransmission(s) of a single MAC PDU for one or more HARQ processes according to the selection.

In some implementations, for each transmission opportunity, TX UE may select one of the indicated MCS value(s) according to the indicated CBR and then may transmit a MAC PDU with the selected MCS value. If CBR is not indicated by the DCI, TX UE may select one according to the CBR measured by TX UE.

In some implementations, when one of the following criteria of the resource reselection procedure is met for one of the (activated) HARQ processes, TX UE may clear the resources assigned to the HARQ process in the selected sidelink grant, and may trigger the TX resource (re-)selection and then reselect reserved resources of the selected sidelink grant only for the HARQ process in the resource reservation procedure. Note that other resources not assigned to the HARQ process in the selected grant may be neither cleared nor reselected in this step.

1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in sl-ProbResourceKeep, wherein SL_RESOURCE_RESELECTION_COUNTER is maintained for each (activated) HARQ process associated to the selected resource pool; or 1> if neither transmission nor retransmission has been performed by the MAC entity on any resource assigned to the HARQ process in the selected sidelink grant during a certain time duration; or 1> if sl-ReselectAfter is configured and the number of consecutive unused transmission opportunities on resources assigned to the HARQ process in the selected sidelink grant is equal to sl-ReselectAfter; or 1> if a resource assigned to the HARQ process in the selected sidelink grant cannot accommodate a RLC SDU by using the maximum allowed MCS configured by upper layers in sl-MaxMCS-PSSCH and the MAC entity selects not to segment the RLC SDU; or 1> if a resource(s) assigned to the HARQ process in a selected sidelink grant is not in the resources indicated for re-evaluation by the physical layer; or 1> if a received SCI indicating a priority value lower than p_preemption, if pre-emption is enabled by RRC, schedules a sidelink transmission expected to overlap with a resource(s) assigned to the HARQ process in a selected sidelink grant used to transmit a MAC PDU carrying a MAC CE and/or logical channel(s) of which the highest priority value is higher than the priority value indicated by the received SCI, and a SL-RSRP result measured on the received SCI is higher than the last RSRP threshold.

In some implementations, when one of the following criteria of the resource reselection procedure is met for one of the (activated) HARQ processes, TX UE may clear all resources assigned to all (activated) HARQ processes in the selected sidelink grant, and may trigger the TX resource (re-)selection and then reselects all the reserved resources of the selected sidelink grant for all HARQ processes associated to the selected pool of resources in the resource reservation procedure:

1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in sl-ProbResourceKeep, wherein SL_RESOURCE_RESELECTION_COUNTER is maintained for all (activated) HARQ processes associated to each (activated) selected resource pool; or 1> if a pool of resources is configured or reconfigured by upper layers; or 1> if there is no selected sidelink grant on the resource pool (re-)selected by the TX carrier (re-)selection procedure; or 1> if transmission(s) with the selected sidelink grant for any HARQ process cannot fulfil the latency requirement of the data in a logical channel or a MAC CE according to the associated priority, and the MAC entity selects not to perform transmission(s) corresponding to a single MAC PDU.

In some implementations, if TX UE triggers the TX resource (re-)selection and then reselects the reserved resources of the selected sidelink grant for one or more HARQ processes associated to the selected pool of resources in the resource reservation procedure, TX UE may indicate TX resource (re-)selection to the network via at least one of PUCCH, UCI and/or MAC CE. The PUCCH, UCI and/or MAC CE may additionally indicate at least one of the (re-)selected sidelink grant, the HARQ Process ID associated to the sidelink process and/or a particular ID associated to the pool of resources (or the selected sidelink grant) to the network.

In step S1214, if sidelink resource allocation mode 2 was indicated by the DCI and/or the SCI with an indication to a pool of resources, TX UE may autonomously perform one or more of (re-)transmissions of a TB for at least the logical channel for each HARQ process up to the determined number of HARQ processes and/or the determined number of HARQ retransmissions by using the selected sidelink grant that is the reserved transmission opportunities of PSCCH and/or PSSCH durations on the pool of resources.

In some implementations, the TB may be stored in a sidelink process (i.e., HARQ process for sidelink). The sidelink process may be associated to the HARQ Process ID for the selected sidelink grant.

In step S1216, TX UE may receive SL HARQ feedback to sidelink transmissions on PSFCH from RX UE.

In some implementations, if TX UE receives SL HARQ feedback to their transmission on PSFCH, and if PUCCH resource and/or PUSCH resource was indicated in the received DCI, TX UE may send the received SL HARQ feedback to the network by using the PUCCH resource and/or the PUSCH resource.

In some implementations, if sidelink resource allocation mode 1 was indicated by the DCI and/or the SCI, TX UE may monitor PDCCH from the network. If TX UE receives SL grant and/or an indication to a pool of resources on PDCCH, TX UE may perform transmission of data of the logical channel for each HARQ process on the pool of resources by using the SL grant.

In step S1218, if the TB for a sidelink process is not positively acknowledged from RX UE and/or the PDB of the TB still remains, and/or the maximum number of retransmissions of the TB is not reached for the pool of resources (or a selected sidelink grant); and if no retransmission grant has been reserved by TX UE or given by the network and if data is available for a logical channel mapped to the pool of resources (or the selected sidelink grant) or a MAC CE is available mapped to the pool of resources (or the selected sidelink grant), TX UE may send PUCCH, UCI and/or MAC CE to network to request a retransmission grant for the pool of resources (or the selected sidelink grant). The PUCCH, UCI and/or MAC CE may be configured per UE, per pool of resources or per selected sidelink grant in order to request a retransmission grant for sidelink resource allocation mode 2. The PUCCH, UCI and/or MAC CE may indicate the HARQ NACK for requesting a retransmission grant. UCI and/or MAC CE may be carried over PUSCH. The PUCCH, UCI and/or MAC CE may additionally indicate at least one of the HARQ process ID associated to the sidelink process and/or a particular ID associated to the pool of resources (or the selected sidelink grant) to the network.

In some implementations, if any retransmission grant reserved by TX UE or given by the network is still available for next retransmission(s) of the TB, TX UE may send the PUCCH, UCI and/or MAC CE indicating the HARQ ACK to the network but maintain any remaining retransmission grant of the TB which has been reserved by TX UE.

In some implementations, if TX UE performs transmissions up to the value of CR_limit configured by the network for the pool of resources, TX UE may send PUCCH, UCI and/or MAC CE to request a new (retransmission) grant to the network for sidelink resource allocation mode 2. The PUCCH, UCI and/or MAC CE may indicate the HARQ NACK for requesting a retransmission grant. The PUCCH, UCI and/or MAC CE may additionally indicate at least one of the HARQ process ID associated to the Sidelink process and/or a particular ID associated to the pool of resources (or the selected sidelink grant) to the network.

In some implementations, if the TB for a sidelink process is positively acknowledged from RX UE and/or the PDB of the TB does not remain, and/or the maximum number of retransmissions of the TB is reached for the pool of resources (or a selected sidelink grant), TX UE may send the PUCCH, UCI and/or MAC CE indicating the HARQ ACK to the network and release any remaining retransmission grant of the TB which has been reserved by TX UE. The PUCCH, UCI and/or MAC CE may additionally indicate at least one of the HARQ process ID associated to the Sidelink process and/or a particular ID associated to the pool of resources (or the selected sidelink grant) to the network.

In some implementations, after the end of the transmission of the PUCCH, UCI and/or MAC CE, TX UE may start to monitor PDCCH with a CRC scrambled by SL-RNTI, SLCS-RNTI or a particular RNTI which is dedicated to a retransmission of sidelink resource allocation mode 2.

Now, FIG. 13 whose operation follows the operation of FIG. 12 is described.

In step S1300, if a retransmission grant associated to the HARQ process ID has been received by the DCI on the PDCCH from the network, TX UE may clear any retransmission grant, if any, which has been reserved by TX UE. Then, TX UE may add the retransmission grant to the selected sidelink grant.

In some implementations, the DCI for the retransmission grant of a TB may include one or more of the following elements.

An indication related to either transmissions of multiple MAC PDU or transmission of single MAC PDU for the retransmission grant;

An indication related to sidelink resource allocation mode 1 or sidelink resource allocation mode 2 for the retransmission grant;

An indication related to request of retransmission grant for sidelink resource allocation mode 2, if a pool of resources for sidelink resource allocation mode 2 is activated or configured;

An indication related to the pool of resources associated to the retransmission grant;

An indication related to one or more HARQ process IDs associated to the given retransmission grant for the pool of resources;

The number(s) of HARQ retransmissions used for the TB;

The MCS value(s) used for the retransmission grant;

The number(s) of subchannels used for the retransmission grant;

The number of symbols in a slot used for the retransmission grant;

The value(s) of SL_RESOURCE_RESELECTION_COUNTER used for the pool of resources associated to the retransmission grant;

The value of sl-ProbResourceKeep used for triggering a resource reselection on the pool of resources associated to the retransmission grant;

The value of sl-ReselectAfter for the retransmission grant;

Time and/or frequency resource location for the retransmission grant;

The CBR measured by the network or reported by a UE;

The value of p_preemption used for the retransmission grant;

The value of any parameter used for resource reservation or resource reselection on the pool of resources associated to the retransmission grant;

Activation and/or deactivation of PUCCH carrying SL HARQ feedback and PUCCH resource configuration for sidelink resource allocation mode 1 or mode 2;

UL resource for sending confirmation to the retransmission grant to the network;

The priority of the retransmission grant used for prioritization.

In steps S1302 and S1304, TX UE may perform one or more retransmissions of the TB for the sidelink process associated to the HARQ process ID by using the retransmission grant, until the TB for a sidelink process is positively acknowledged from RX UE and/or the PDB of the TB does not remain, and/or the maximum number of retransmissions of the TB is reached.

In some implementations, if a retransmission grant associated to the HARQ process ID has been not received by the DCI on the PDCCH from the network for a certain duration configured by the network, TX UE may reserve a retransmission grant for retransmission(s) of the TB for the sidelink process associated to the HARQ process ID. Alternatively, TX UE may flush the buffer of the Sidelink process associated to the HARQ process ID.

In step S1306, if the TB for a sidelink process is not positively acknowledged from RX UE and/or the PDB of the TB still remains, and/or the maximum number of retransmissions of the TB is not reached for the pool of resources (or a selected sidelink grant); and if no retransmission grant has been reserved by TX UE or given by the network and if data is available for a logical channel mapped to the pool of resources (or the selected sidelink grant) or a MAC CE is available mapped to the pool of resources (or the selected sidelink grant), TX UE may send PUCCH, UCI and/or MAC CE to network to request a retransmission grant for the pool of resources (or the selected sidelink grant). The PUCCH, UCI and/or MAC CE may be configured per UE, per pool of resources or per selected sidelink grant in order to request a retransmission grant for sidelink resource allocation mode 2. The PUCCH, UCI and/or MAC CE may indicate the HARQ NACK for requesting a retransmission grant. UCI and/or MAC CE may be carried over PUSCH. The PUCCH, UCI and/or MAC CE may additionally indicate at least one of the HARQ process ID associated to the sidelink process and/or a particular ID associated to the pool of resources (or the selected sidelink grant) to the network.

In step S1308, if a retransmission grant associated to the HARQ process ID has been received by the DCI on the PDCCH from the network, TX UE may clear any retransmission grant, if any, which has been reserved by TX UE. Then, TX UE may add the retransmission grant to the selected sidelink grant.

In step S1310, TX UE may perform one or more retransmissions of the TB for the sidelink process associated to the HARQ process ID by using the retransmission grant, until the TB for a sidelink process is positively acknowledged from RX UE and/or the PDB of the TB does not remain, and/or the maximum number of retransmissions of the TB is reached.

In step S1312, TX UE may receive SL ACK to sidelink transmissions on PSFCH from RX UE.

In Step S1314, TX UE may skip all remaining grants or use all remaining retransmission grants for a new TB.

In some implementations, when one of the above criteria of the resource reselection procedure is met for one of the (activated) HARQ processes and/or deactivation/release indication to the pool of resources is received from the network, TX UE may clear the given retransmission grant assigned to the HARQ process in the selected sidelink grant. TX UE may trigger the TX resource (re-)selection and then reselect reserved resources of the selected sidelink grant only for the HARQ process in the resource reservation procedure. TX UE may flush the buffer of the sidelink process associated to the HARQ process ID and use the reserved resources for initial and retransmission(s) of a new TB. Alternatively, TX UE may not flush the buffer of the sidelink process associated to the HARQ process ID and use the reserved resources for retransmission(s) of the TB stored in the buffer of the sidelink process.

In some implementations, when one of the above criteria of the resource reselection procedure is met for one of the (activated) HARQ processes and/or deactivation/release indication to the pool of resources is received from the network, TX UE may clear all retransmission grants assigned to all (activated) HARQ processes in the selected sidelink grant. TX UE may trigger the TX resource (re-)selection and then reselect all the reserved resources of the selected sidelink grant for all HARQ processes associated to the selected pool of resources in the resource reservation procedure. TX UE may flush the buffer of the sidelink process associated to the HARQ process ID and use the reserved resources for initial and retransmission(s) of a new TB. Alternatively, TX UE may not flush the buffer of the sidelink process associated to the HARQ process ID and use the reserved resources for retransmission(s) of the TB stored in the buffer of the Sidelink process.

In some implementations, if TX UE triggers the TX resource (re-)selection and then reselects the reserved resources of the selected sidelink grant for one or more HARQ processes associated to the selected pool of resources in the resource reservation procedure, the UE may indicate TX resource (re-)selection to the network via PUCCH, UCI and/or MAC CE. The PUCCH, UCI and/or MAC CE may additionally indicate at least one of the (re-)selected sidelink grant, the HARQ process ID associated to the Sidelink process and/or a particular ID associated to the pool of resources (or the selected sidelink grant) to the network.

In FIGS. 12 and 13, for the sake of the convenience, sidelink transmission is exemplarily described. Implementations of the present disclosure may be applied to uplink transmission as well. Therefore, sidelink transmission in FIGS. 12 and 13 may be replaced by uplink transmission.

The present disclosure can have various advantageous effects.

For example, retransmission in sidelink resource allocation mode 2 can be controlled through a retransmission grant in sidelink resource allocation mode 1.

For example, UE performing HARQ transmissions can properly handle retransmission, in particular when UE autonomously determines new transmission and/or retransmission up to N number of transmissions of a TB on a pool of resources and performs additional retransmission(s) beyond N number of transmissions by using resource(s) allocated by the network.

For example, the system can properly control the number of retransmissions for UE performing HARQ transmissions on a pool of resources.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first device adapted to operate in a wireless communication system, the method comprising:
   receiving, from a network, a configuration of a pool of resources for a sidelink resource allocation mode 2 in which the first device determines sidelink transmission resources and timing;
   autonomously selecting a sidelink grant from the pool of resources for N number of transmissions of a Transport Block (TB) stored for a process;
   performing, to a second device, transmission of the TB up to the N number of transmissions;
   determining that i) the N number of transmissions is completed and ii) retransmission of the TB is required;
   based on the determination that i) the N number of transmissions is completed and ii) retransmission of the TB is required, and that the first device is configured with the sidelink resource allocation mode 2, transmitting, to the network, a request for a retransmission grant for the process wherein the request includes a Hybrid Automatic Repeat request (HARQ) process identifier (ID) associated with the process;
   receiving, from the network, the retransmission grant related to the HARQ process ID; and
   performing, to the second device, the retransmission of the TB based on the retransmission grant,
   wherein the first device is a first wireless device, and
   wherein the second device is a second wireless device.

2. The method of claim 1, wherein the autonomously selected sidelink grant is indicated to the network.

3. The method of claim 1, wherein the retransmission of the TB is required based on i) the transmission of the TB not being positively acknowledged from the second device, or ii) a Packet Delay Budget (PDB) of the TB still remains.

4. The method of claim 1, wherein the request for the retransmission grant is transmitted via a Physical Uplink Control Channel (PUCCH) or Uplink Control Information (UCI) or a Media Access Control (MAC) Control Element (CE).

5. The method of claim 4, wherein the PUCCH or the UCI or the MAC CE is configured per device or per pool of resources.

6. The method of claim 1, wherein the request for the retransmission grant corresponds to a HARQ Negative Acknowledgement (NACK).

7. The method of claim 1, wherein any retransmission grant which has been reserved by the first device is cleared based on receiving the retransmission grant.

8. The method of claim 1, wherein the first device is in communication with at least one of a mobile device, a network, or autonomous vehicles other than the first device.

9. A first device in a wireless communication system, the first device comprising:
    at least one transceiver;
    at least one processor; and
    at least one memory operably connectable to the at least one processor and storing instructions that, based on being executed by the at least one processor, perform operations comprising:
    receiving, from a network via the at least one transceiver, a configuration of a pool of resources for a sidelink resource allocation mode 2 in which the first device determines sidelink transmission resources and timing;
    autonomously selecting a sidelink grant from the pool of resources for N number of transmissions of a Transport Block (TB) stored for a process;
    performing, to a second device via the at least one transceiver, transmission of the TB up to the N number of transmissions;
    determining that i) the N number of transmissions is completed and ii) retransmission of the TB is required;
    based on the determination that i) the N number of transmissions is completed and ii) retransmission of the TB is required and that the first device being configured with the sidelink resource allocation mode 2, transmitting, to the network via the at least one transceiver, a request for a retransmission grant for the process wherein the request includes a Hybrid Automatic Repeat request (HARQ) process identifier (ID) associated with the process;
    receiving, from the network via the at least one transceiver, the retransmission grant related to the HARQ process ID; and
    performing, to the second device via the at least one transceiver, the retransmission of the TB based on the retransmission grant,
    wherein the first device is a first wireless device, and
    wherein the second device is a second wireless device.

10. The first device of claim 9, wherein the autonomously selected sidelink grant is indicated to the network.

11. The first device of claim 9, wherein the retransmission of the TB is required based on i) the transmission of the TB not being positively acknowledged from the second device, or ii) a Packet Delay Budget (PDB) of the TB still remains.

12. The first device of claim 9, wherein the request for the retransmission grant is transmitted via a Physical Uplink Control Channel (PUCCH) or Uplink Control Information (UCI) or a Media Access Control (MAC) Control Element (CE).

13. The first device of claim 12, wherein the PUCCH or the UCI or the MAC CE is configured per device or per pool of resources.

14. The first device of claim 9, wherein the request for the retransmission grant corresponds to a HARQ Negative Acknowledgement (NACK).

15. The first device of claim 9, wherein any retransmission grant which has been reserved by the first device is cleared based on receiving the retransmission grant.

16. A processing apparatus adapted to control a first device performing a sidelink transmission to a second device in a wireless communication system, the processing apparatus comprising:
    at least one processor; and
    at least one memory operably connectable to the at least one processor, wherein the at least one processor is configured to perform operations comprising:
    obtaining a configuration of a pool of resources for a sidelink resource allocation mode 2 in which the first device determines sidelink transmission resources and timing;
    autonomously selecting a sidelink grant from the pool of resources for N number of transmissions of a Transport Block (TB) stored for a process;
    determining that i) the N number of transmissions is completed and ii) retransmission of the TB is required;
    based on the determination that i) the N number of transmissions is completed and ii) retransmission of the TB is required and that the first device being configured with the sidelink resource allocation mode 2, generating a request for a retransmission grant for the process, wherein the request includes a Hybrid Automatic Repeat request (HARQ) process identifier (ID) associated with the process; and
    obtaining the retransmission grant related to the HARQ process ID,
    wherein the first device is a first wireless device, and
    wherein the second device is a second wireless device.

* * * * *